(12) United States Patent
Issa (10) Patent No.: US 7,730,130 B2
(45) Date of Patent: Jun. 1, 2010

(54) AUTOMATIC CREATION OF BIDIRECTIONAL ONLINE ALBUM LINKS IN A PEER-TO-PEER PHOTO SHARING NETWORK

(75) Inventor: Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1033 days.

(21) Appl. No.: 11/115,573

(22) Filed: Apr. 26, 2005

(65) Prior Publication Data

US 2006/0242238 A1 Oct. 26, 2006

(51) Int. Cl.
G06F 15/16 (2006.01)
(52) U.S. Cl. ...................... 709/204; 709/229
(58) Field of Classification Search ........... 709/204, 709/206, 205, 201, 217, 229, 244
See application file for complete search history.

(56) References Cited

U.S. PATENT DOCUMENTS

| | | | | |
|---|---|---|---|---|
| 5,995,099 A | * | 11/1999 | Horstmann | 715/205 |
| 6,757,684 B2 | * | 6/2004 | Svendsen et al. | 707/10 |
| 2004/0169684 A1 | * | 9/2004 | Orth et al. | 345/804 |
| 2005/0114711 A1 | * | 5/2005 | Hesselink et al. | 713/201 |
| 2005/0192940 A1 | * | 9/2005 | Morris | 707/3 |
| 2006/0149846 A1 | * | 7/2006 | Schuba | 709/229 |
| 2006/0242238 A1 | * | 10/2006 | Issa | 709/204 |
| 2007/0022174 A1 | * | 1/2007 | Issa | 709/217 |
| 2008/0163068 A1 | * | 7/2008 | Gorzela | 715/738 |

OTHER PUBLICATIONS

"A Beginner's Guide to TrackBack," www.movabletype.org/trackback/beginners/, pp. 1-90.

* cited by examiner

*Primary Examiner*—Ramy M Osman
(74) *Attorney, Agent, or Firm*—Withrow & Terranova, PLLC (57) ABSTRACT

The present invention provides a method and system for creating a bidirectional link between first and second online albums in a peer-to-peer photo sharing network. Exemplary embodiments include receiving on a first peer, a user request to create a bidirectional link, wherein the request includes an identification of a first online album on the first peer and a URL of a second online album on a second peer; automatically sending to the second peer, a URL of the first online album and a request to create a link on the second online album to the first album; and automatically creating a link on the first online album to the second online album using the URL of the second online album. In a further embodiment, the link to the second online album is displayed with information regarding the second online album, including an online status of the peer hosting the linked online album.

34 Claims, 7 Drawing Sheets

AUTOMATIC CREATION OF BIDIRECTIONAL ONLINE ALBUM LINKS IN A PEER-TO-PEER PHOTO SHARING NETWORK

FIELD OF THE INVENTION

The present invention relates to online photo sharing, and more particularly to a method and system for automatically creating bidirectional links between two online albums hosted on different peers in a peer-to-peer photo sharing network.

BACKGROUND OF THE INVENTION

Online photo sharing sites provide consumers with a way to upload and store digital images for viewing and sharing with others over the Internet. The assignee of the present application has developed a peer-to-peer (P2P) based photo sharing site in which the computers of each member in the network become peer nodes that are capable of directly communicating with other peer nodes in the network so that consumers can share images with one another without going through a central server. In both types of photo sharing sites, users typically store uploaded images in online web photo albums that guests are invited to view, download, and order prints.

In contrast to photo sharing sites, a blog is a hosted service on a central site that allows consumers to publish or post personal journals called weblogs, or blogs for short, on the Web. A personal blog maintains dated text entries in chronological order and can take many forms, such as an online scrapbook for pasting links and quotes from items found on the Web; personal diaries, often illustrated with digital snapshots; and some are more like digital soapboxes, providing a platform for airing opinions and commentary. A user (known as a blogger) adds entries using a simple online form in their browser, where weblog publishing software on the central server takes care of formatting the page layout and other supporting functions.

A publishing standard known as MOVABLETYPE by SIX APART of San Francisco, Calif. is widely used for blogging. One service of the standard called TrackBack allows two blog entries to link bidirectionally. This allows a blogger to comment on another person's blog by creating one link on their own blog to the other person's blog, and by creating a second link on the other person's blog to the blogger's blog, creating a bidirectional link.

Although TrackBacks are a convenient service to bloggers, TrackBacks have several disadvantages. One is that blogs are hosted on a central site, meaning that one user or blogger, cannot directly access the blog of another user without going through the central site. Therefore, the track backs must be created through the central site. In addition, although blogs may contain some image data, a TrackBack is only capable of displaying a headline and perhaps the first paragraph of the blog being discussed so that when a user is visiting blog A, the user can read a text message regarding blog B and decide whether or not to click on a link to visit blog B.

In a peer-to-peer image file sharing system, people create albums about all kinds of common subjects, such as pets, children, sports, etc., and it would be desirable to create communities based around the themes of these albums by allowing users to create bidirectional links between albums. However, services such as TrackBack are used with central hosted blogs, but not with P2P networks, or in desktop hosted photo sharing applications. In addition, bidirectional link services such as TrackBacks are capable of only creating links that display text messages, and cannot be used to create a link between online albums, which include primarily thumbnail images, rather than text messages. Therefore, there is no existing mechanism in P2P photo sharing networks for a user viewing an album to discover other related albums except by manually performing keyword searches in online album metadata.

Accordingly, there is a need for a method and system for allowing an online album owner to automatically establish a bidirectional link between another online album and the owner's album to thereby inform guest viewers of both albums of related albums.

BRIEF SUMMARY OF THE INVENTION

The present invention provides a method and system for creating a bidirectional link between first and second online albums in a peer-to-peer photo sharing network. Exemplary embodiments include receiving on a first peer, a user request to create a bidirectional link, wherein the request includes an identification of a first online album on the first peer and a URL of a second online album on a second peer; automatically sending to the second peer, a URL of the first online album and a request to create a link on the second online album to the first album; and automatically creating a link on the first online album to the second online album using the URL of the second online album. In a further embodiment, the link to the second online album is displayed with information regarding the second online album, including an online status of the peer hosting the linked online album.

According to the method and system disclosed herein, the present invention provides users of the P2P photo sharing network with an easy and intuitive way to create automatic bidirectional links between online albums hosted on different peers in the network to thereby inform guest viewers of both online albums of related albums. The present invention may be used create bidirectional links between many sets of online albums in the P2P network, thereby creating peer communities of online albums that share related subject matter.

DETAILED DESCRIPTION OF THE INVENTION

The present invention relates to the creation of automatic bidirectional links between online albums hosted on different peers in a P2P network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The assignee of the present invention has developed a web-based peer-to-peer photo sharing system in which all computers (peers) in the network store images locally and act as servers to other users on the network. A central site accessible by all the peers provides additional functionality, such as coordinating the peers, providing search capabilities for the peers, purchase order fulfillment, etc.

Figure 1:
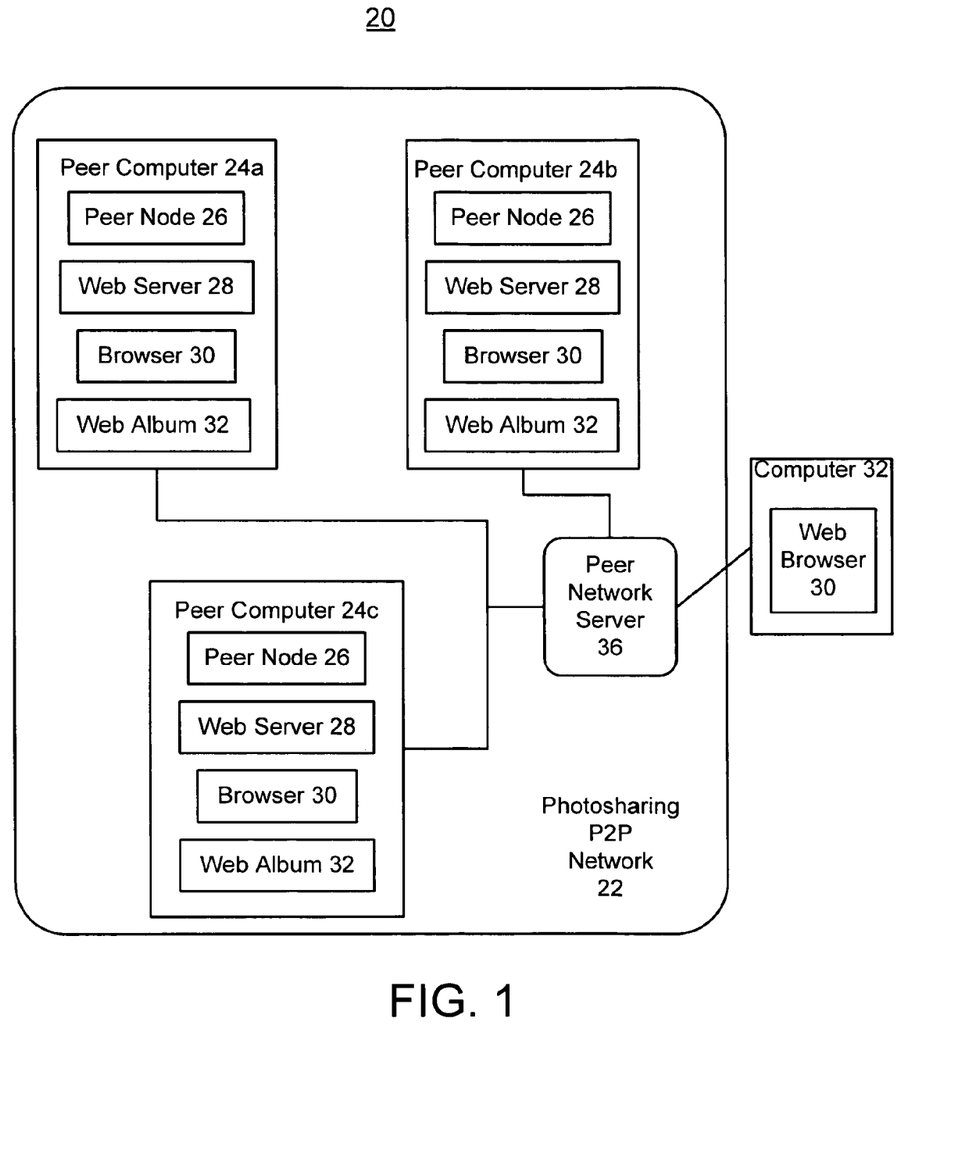
FIG. 1 is a diagram illustrating one embodiment of a peer-to-peer photo sharing system for use in accordance with the present invention.

FIG. 1 is a diagram illustrating one embodiment of a peer-to-peer photo sharing system for use in accordance with the present invention. The peer-to-peer architecture 20 includes a photo sharing P2P network 22, which comprises multiple peer computers 24a-24c (collectively peer computers 24) running peer node software 26 and Web server software 28. The peer node software 26 and peer computer 24 enable the users of the computers to share pictures with others in the network through a Web browser 30 without having to upload their pictures to a Web site. The P2P photo sharing network 22 provides a hybrid peer-to-peer architecture and general HTTP/web browser configuration that incorporates a peer network server (PNS) 36 to coordinate network traffic between peers 24 located behind firewalls, thus allowing access to peers behind firewalls by other peers and by visiting computers 32 not in the network 22. The PNS 36 also provide sporting services to the peers 24 as well as providing a path to which a visiting computer 32, i.e., one not belonging to the P2P network 22, also accesses images from the peer computers 24 via a Web browser 30. As used herein, the peer computers 24 and the visiting computer 32 may comprise any computing device with components necessary for executing the appropriate software, such as PCs, workstations, cell phones, and PDAs, for instance. Also, in a preferred embodiment, the physical communications network is the Internet, although any type network could be used.

Each peer 24 stores online albums 32 and associated images locally in a database (not shown). For example, peer computer 24a may include online album (A), peer computer 24b may include online album (B), and so on. Each online album 32 (and images therein) may have metadata associated with it that describe and categorize the album or images. The P2P photo sharing network 22 is in contrast to the traditional photo sharing model where the user 18 uploads the images from his or her computer to a web server for storage in a static album on a central cite. Instead, in the P2P photo sharing network 22, the peer nodes 16 maintain storage of the actual image data and only the metadata 22 (and, in particular, the thumbnail image) for each image are uploaded to the PNS 36 to enable centralized searching.

In operation, users become members of the P2P photo sharing service by downloading and installing the peer mode application 26 that communicates with the PNS server 36 and enables the user's computer to become a peer in the P2P network 22. Owners of the peer computers 24 register themselves and their peer nodes 26 with the PNS 36 to become members of the service so that other users can search for and view their images. The user 18 may share images that are local on the user's peer computer 24 by uploading the album and image metadata to the PNS 36. The PNS 36 maintains a list of users and peer computers 24, and provides a search engine and a cache of the metadata for each shared image. Users enter search terms to find desired online albums 32 (or images), and in response the PNS 36 displays a list of thumbnail images of the online albums 36 in the network 22 matching the search criteria. The online album(s) 32 is selected by the user from the list and then downloaded to the user's peer computer 24 directly from the peer computer 24 hosting the online album 32 for display. Users 18 may then place orders with the PNS 36 for print creations created from one or more of the selected images 20.

One problem with the above arrangement is that there is currently no mechanism for allowing users of the P2P photo sharing network 22 to easily discover related albums of interest without performing metadata searches. The preferred embodiment of the present invention solves this problem, but providing a method and system for allowing a online album owner to automatically establish a bidirectional link between another online album and the owner's album to thereby inform guest viewers of both online albums of related albums.

Figure 2:
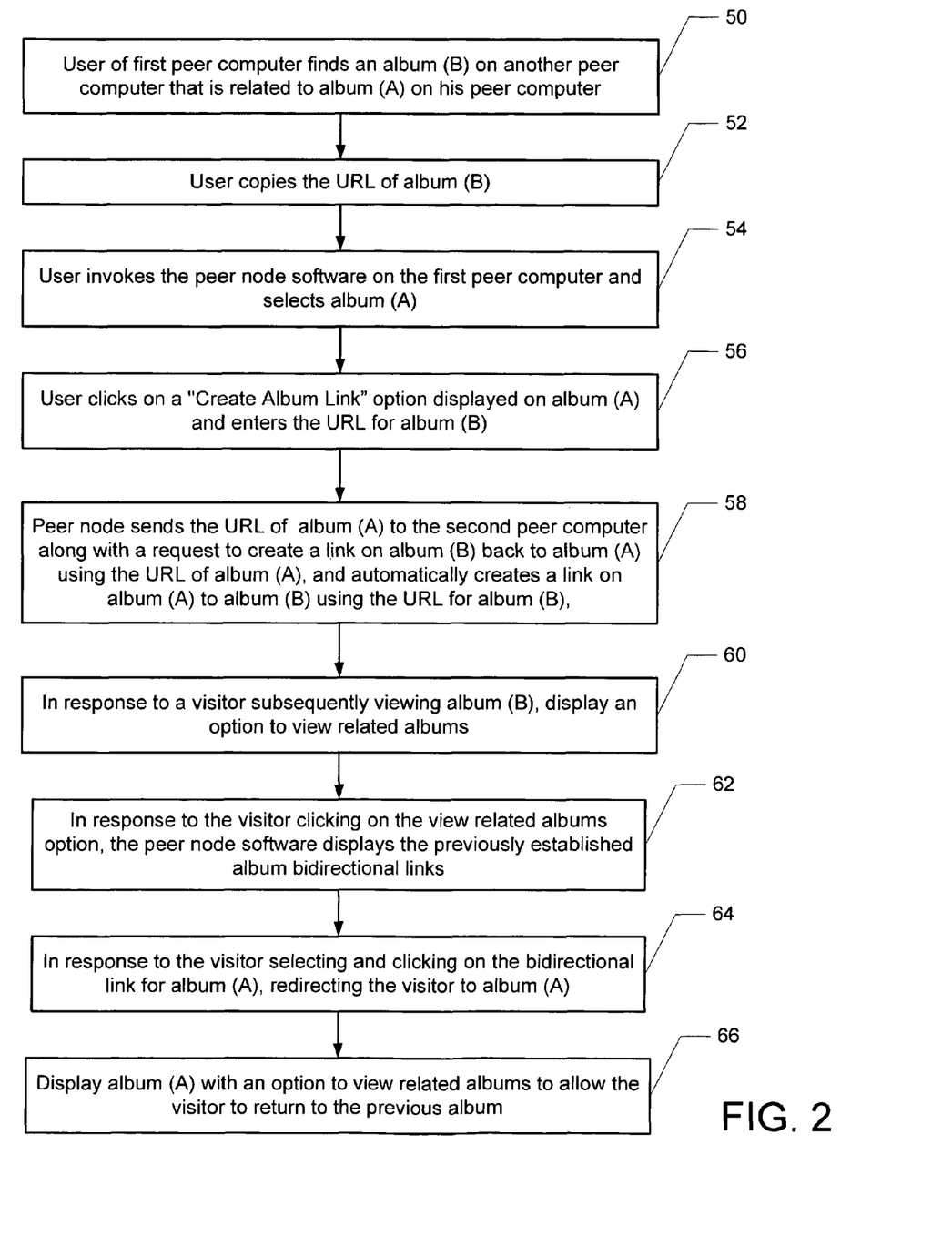
FIG. 2 is a flow diagram illustrating a process for creating a bidirectional link between two online albums in a P2P photo sharing network in accordance with a preferred embodiment.

FIG. 2 is a flow diagram illustrating a process for creating a bidirectional link between two online albums in a P2P photo sharing network in accordance with a preferred embodiment. The process begins in step 50 when a user of peer computer 24a finds a online album (B) on another peer computer 24b that is related to online album (A) on his peer computer 24a. The user may find online album (B) through many methods such as performing a keyword search as described above, or by receiving a verbal or e-mail invitation to view online album (B).

Figure 3A:
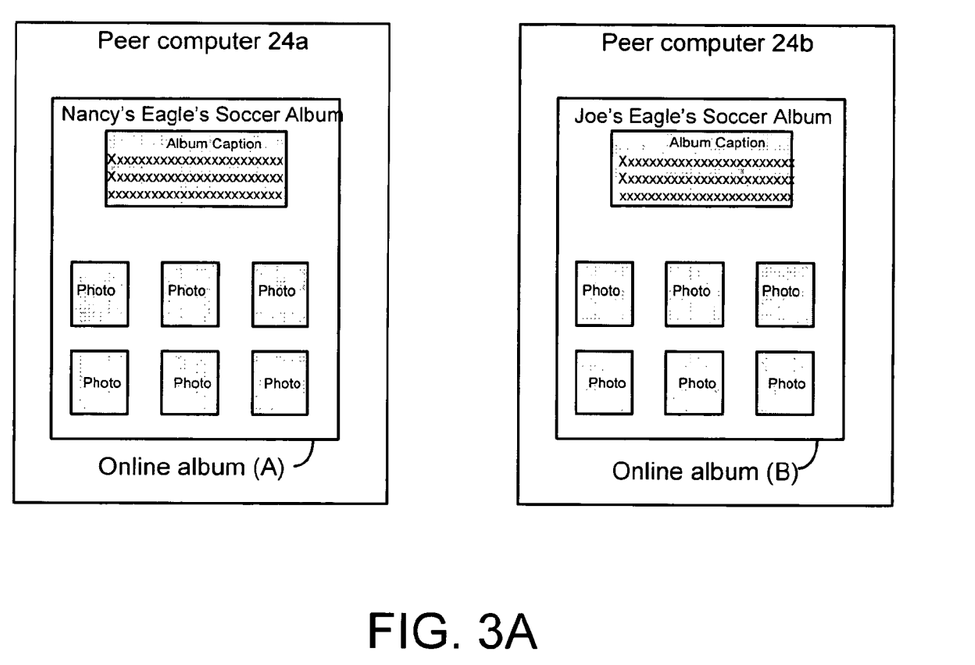
FIG. 3 is a diagram of an exemplary online album (A) on peer computer 24a an exemplary online album (B) on peer computer 24b.

For purposes of illustration, FIG. 3 is a diagram of an exemplary online album (A) on peer computer 24a and online album (B) on peer computer 24b. In this particular example, Nancy, the user of computer 24a, has created a online album (A) of photos regarding the Eagles soccer team. Nancy has discovered that online album (B) on Joe's peer computer 24b is also related to the Eagles soccer team and decides to create a bidirectional link between them.

Referring again to FIG. 2, in step 52, the peer computer 24a user copies the URL of online album (B) from an address line of whatever application was used to navigate to the online album (B), preferably web browser 30, for example. In step 54, the peer computer 24a user invokes the peer node software 26 on peer computer 24a and selects online album (A). In step 56, the peer computer 24a user clicks on a "Create Album Link" option displayed on online album (A) and enters the URL for online album (B) by either pasting the URL or manually entering the URL. In step 58, the peer node software 26 sends the URL of online album (A) to peer computer 24b along with a request for peer computer 24b to create a link on online album (B) back to online album (A) using the URL of online album (A), and automatically creates a link on online album (A) to online album (B) using the URL for online album (B). It should be noted that the steps performed in step 58 are order independent.

In step 60, in response to a visitor subsequently viewing online album (B), an option to view related online albums is displayed. In step 62, in response to the visitor clicking on the view related online albums option, the peer node software 26 displays previously established bidirectional links to related online albums. In step 64, in response to the visitor selecting and clicking on the bidirectional link for online album (A), the user is redirected to online album (A). In step 66, when online album (A) is displayed, the online album is also displayed with an option to view related online albums, which would allow the visitor to return to the previous online album.

Figure 3B:
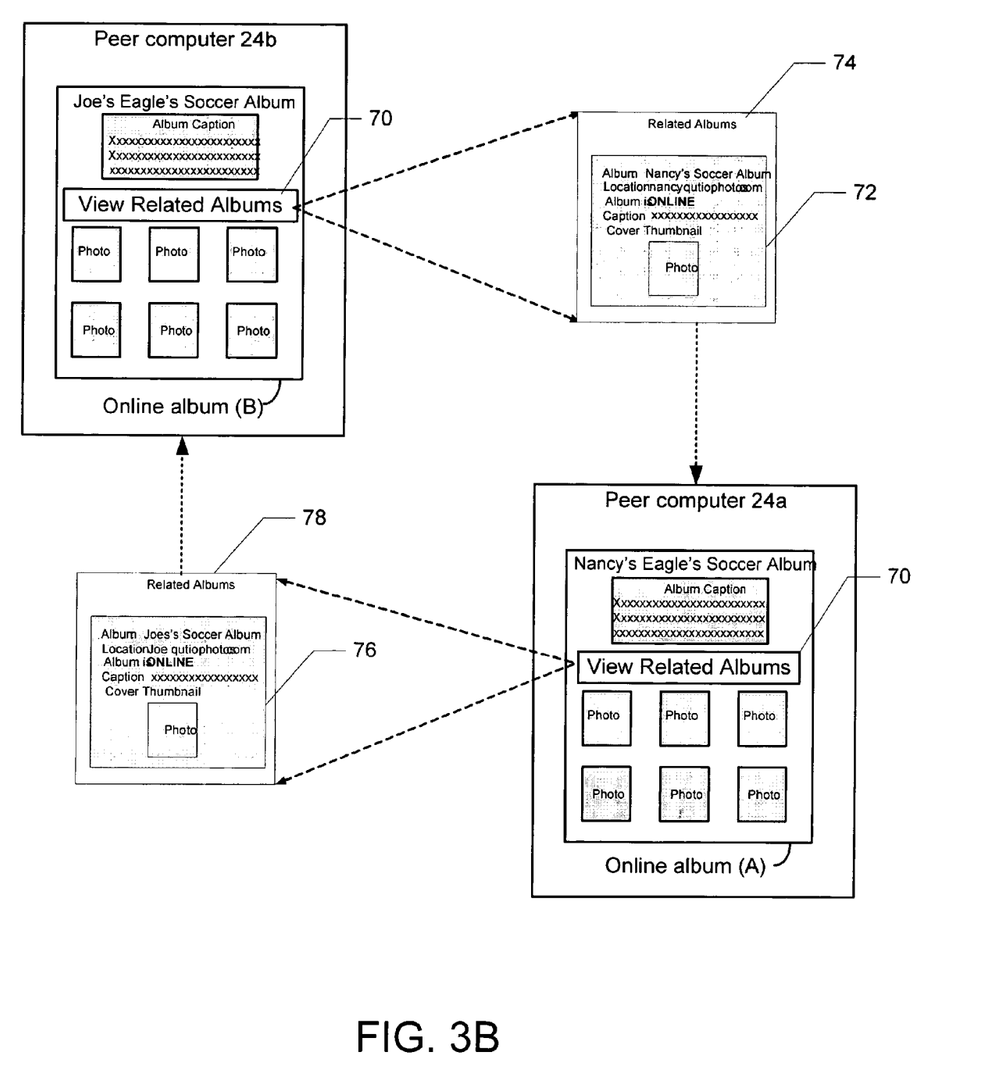

Continuing with the example above, FIG. 3B shows that a visitor viewing Joe's soccer online album (B) would see a related online albums option 70 displayed as a button on the album. Once the user clicks on the option 70, an album link page 74 is preferably displayed listing the bidirectional link 72 to online album (A). Each related album has a bidirectional link 72 entry in the window 74. In a preferred embodiment, each bidirectional link 72 listed in the album link page 74 may include information regarding the linked online album, such as: an album name, a URL of the hosting peer, an online status of the album/peer, a caption, and a cover thumbnail image. Some or all of the items of information may be displayed as hyperlinks. The visitor can then click on the album thumbnail image or the album name and be taken to online album (A) on Nancy's peer computer 24a. In turn, Nancy's soccer album (A) would also have related online albums option 70 that when clicked, causes a bidirectional link 76 back to Joe's online album (B) to be displayed in pop-up window 78.

As described above, the bidirectional link 72 for each related album in the in the album link page 74 displays a status indication of whether the online album (and its hosting peer computer) is online or offline as a convenience to the visitor. The peer computer 24a creating the album link page 74 may obtain this information by checking with the PNS 36 associated with the remote peer computer 24b or from the remote peer computer 24b itself.

Figure 4:
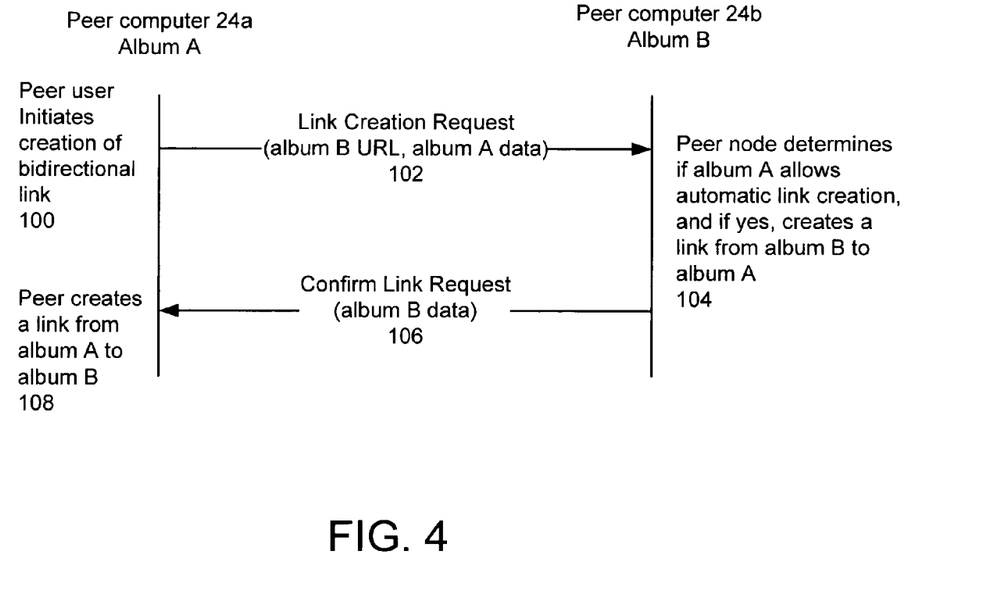
FIG. 4 is a flow diagram illustrating the process of creating the bidirectional link described in step 58 of FIG. 2 in further detail.

FIG. 4 is a flow diagram illustrating the process of creating the bidirectional link described in step 58 of FIG. 2 in further detail. After the user of peer computer 24a initiates the creation of a bidirectional link in step 100, the peer node software 26 sends a link creation request via a web service (e.g., XML over HTTP) to the receiving peer computer 24b in step 102. The link creation request preferably includes the URL of the remote online album (B) and online album (A) data. In a preferred embodiment, the online album (A) data includes the following fields:

Initiating Peer Name—the name or ID of the initiating peer (peer 24a)

Album Name—the name of the initiating peer album (album A)

Album URL—the URL of the online album (album A) on the initiating peer (peer 24a)

Album Caption—the caption of the initiating Peer album (album A)

Album Cover Thumbnail URL—the URL of the cover thumbnail representing the online album (album A) on the initiating peer (peer 24a)

In step 104, the peer node software 26 on peer computer 24b receives the link request and determines if Album A allows automatic link creation, and if yes, creates a link on album B to album A.

In step 106, the peer node software 26 on peer computer 24b transmits a confirm link request to the initiating peer computer 24a that preferably includes the name of the receiving peer computer 24b and online album (B) data. In a preferred embodiment, the online album (BA) data includes the following fields:

Album Name—the name of the receiving peer album (album B)

Album URL—the URL of the receiving peer album (album B)

Album Caption—The caption of the receiving peer album (album B)

Album Cover Thumbnail URL—the URL of the cover thumbnail for the receiving peer album (album B)

In step 108, the initiating peer computer 24a receives the confirm link request and creates an album link on online album (A) to online album (B) to complete the bidirectional link. In a preferred embodiment, the peer node software 26 stores the online album links in a local peer database. In addition, the peer node software 26 may provide an administrative interface that allows the user to access and remove the online album links at any time.

Figure 5:
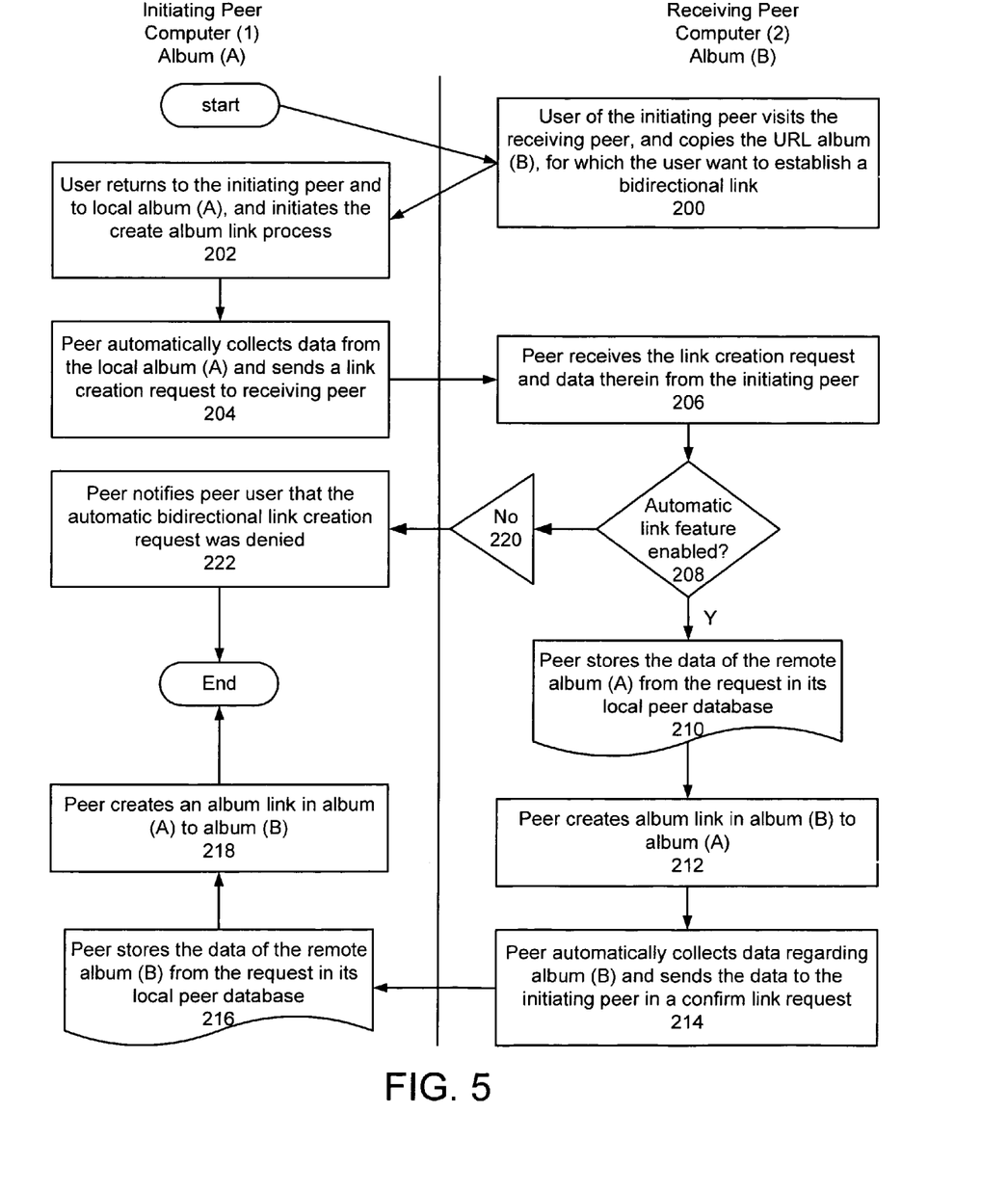
FIG. 5 is a flow diagram illustrating details of the processing logic used by initiating and receiving peer computers during creation of an automatic bidirectional link in accordance with a preferred embodiment of the present invention.

FIG. 5 is a flow diagram illustrating details of the processing logic used by initiating and receiving peer computers during creation of an automatic bidirectional link in accordance with a preferred embodiment of the present invention. This description will be provided in terms of a first peer computer, referred to herein as the initiating peer, that hosts online album (A) and a second peer computer, referred to herein as the receiving peer, that hosts online album (B). The process begins in step 200 when a user of the initiating peer visits the receiving peer, and copies the URL of online album (B), for which the user wants to establish a bidirectional link.

In step 202, the user returns to the initiating peer and to local album (A), and initiates the create album link process. In step 204, the peer node software 26 automatically collects data from the local online album (A) and sends a link creation request to the receiving peer. In step 206, the receiving peer receives the link creation request and data therein from the initiating peer.

In step 208, the receiving peer determines if the user-settable automatic link feature on receiving peer is enabled. If it is, then in step 210, the receiving peer stores the data of the remote album (A) from the request in its local peer database. In step 212, the receiving peer uses the URL of album (A) and the URL of album (B) specified in the request to create an album link in album (B) to album (A). In step 214, receiving peer automatically collects data regarding album (B) and sends the data to the initiating peer in a confirm link request.

In step 216, the initiating peer receives the confirm link request and stores online album (B) data from the request in its local peer database. In step 218, the initiating peer uses the URL of album (A) and the URL of album (B) to create an album link in album (A) to album (B), completing the bidirectional link.

If, in step 208, the receiving peer determines that the automatic link feature is disabled, then the receiving peer notifies the initiating peer in step 220. And in step 222, the initiating peer notifies the initiating peer user that the automatic bidirectional link creation request was denied, and the process ends.

Figure 6:
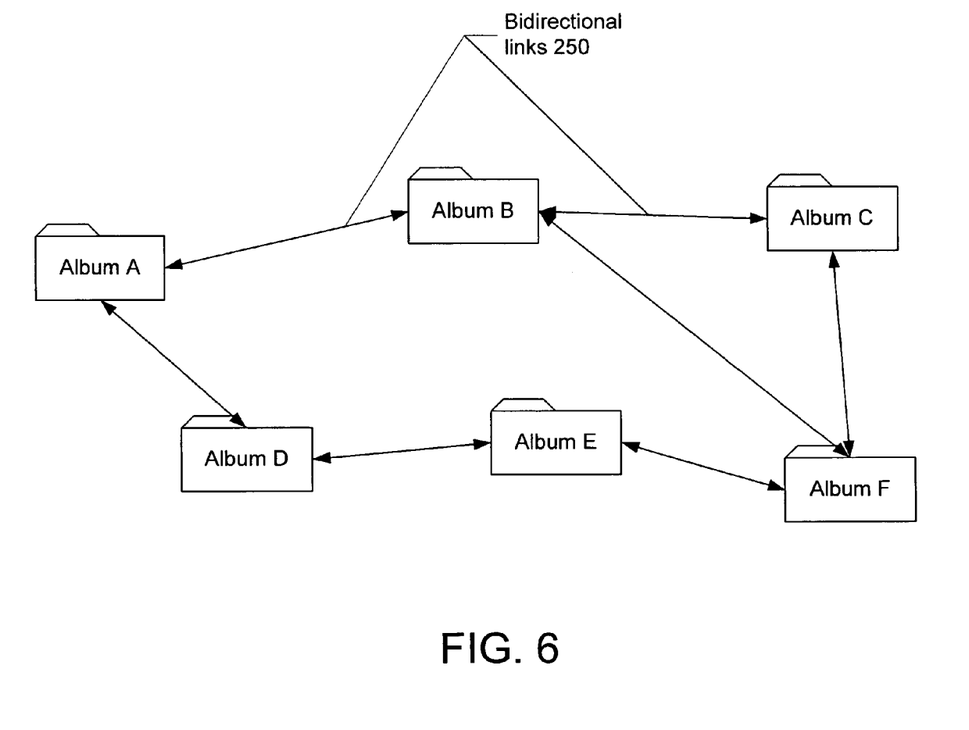
FIG. 6, the method and system of the present invention enable the creation of bidirectional links between sets of online albums, thereby creating peer communities in the P2P photo sharing network of online albums that share related subject matter.

A method and system for automatically creating bidirectional links between two online albums hosted on different peers in a peer-to-peer photo sharing network has been disclosed. As shown in FIG. 6, the method and system of the present invention enable the creation of bidirectional links 250 between sets of online albums, thereby creating peer communities in the P2P photosharing network of online albums that share related subject matter.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for creating a bidirectional link between first and second online albums in a peer-to-peer photo sharing network, comprising;
   receiving on a first peer, a user request to create a bidirectional link, wherein the request includes an identification of a first online album on the first peer and a URL of a second online album on a second peer;
   automatically sending to the second peer, a URL of the first online album and a request to create a link on the second online album to the first online album using the first online album URL; and
   automatically creating a link on the first online album to the second online album using the URL of the second online album, wherein the first and second peers are computing devices.

2. The method of claim 1 further including: displaying with the link to the second online album, information regarding the second online album, including an online status of the peer hosting the linked online album.

3. The method of claim 1 further including:
   in response to a visitor viewing the second online album, displaying the link to the first online album; and
   in response to the visitor clicking on the link to the first online album, redirecting the visitor to the first online album, wherein the first online album is displayed with the link to the second album, thereby allowing the visitor to return to the second online album.

4. The method of claim 3 further including: displaying on a second online album an option to view related online albums, and displaying the link to the first online album in response to the visitor clicking on the option to view related online albums.

5. The method of claim 4 further including: in response to the visitor clicking on the option to view related online albums, displaying an album link page that lists links to related online albums.

6. The method of claim 1 further including: providing in the request sent from the first peer to the second peer the URL of the second online album and first album data.

7. The method of claim 6 further including: providing as the first album data any combination of a name or ID of the first peer, a name of the first online album, and a thumbnail image representing the first online album.

8. The method of claim 7 further including: in addition to creating the link on the second online album to the first album by the second peer, transmitting a confirm link request to the first peer computer that includes a name of the second peer and second online album data.

9. The method of claim 8 further including: providing as the second album data any combination of a name of the second online album, a URL of the second online album, and a thumbnail image representing the second online album.

10. The method of claim 9 wherein the first peer creates the link on the first online album to the second online album using the second album data received from the second peer.

11. The method of claim 1 further including: in response to the second peer receiving a request to create a link from a first peer, determining if the second online album allows automatic link creation, and notifying the user of the first node if the second node does not allow automatic link creation.

12. A peer-to-peer photo sharing network including at least one peer node server and a plurality of peer computers, each of the peers capable of communicating with the other peers and with the peer node server, each of the peers further capable of storing digital images and displaying the images in online albums, wherein at least a first one of the peer computers is configured to perform functions of:
   receiving a user request to create a bidirectional link, wherein the request includes an identification of a first online album on the first peer and a URL of a second online album on a second peer;
   automatically sending to the second peer, a URL of the first online album and a request to create a link on the second online album to the first online album using the first online album URL; and
   automatically creating a link on the first online album to the second online album using the URL of the second online album.

13. The network of claim 12 wherein the link to the second online album is displayed with information regarding the second online album, including an online status of the peer hosting the linked online album.

14. The network of claim 12 wherein in response to a visitor viewing the second online album, the second online album is displayed with the link to the first online album; and in response to the visitor clicking on the link to the first online album, the visitor is redirected to the first online album, wherein the first online album is displayed with the link to the second album, thereby allowing the visitor to return to the second online album.

15. The network of claim 14 wherein the second online album is displayed with an option to view related online albums, and the link to the first online album is displayed in response to the visitor clicking on the option to view related online albums.

16. The network of claim 15 wherein in response to the visitor clicking on the option to view related online albums, an album link page is displayed that lists links to related online albums.

17. The network of claim 12 wherein the request sent from the first peer to the second peer includes the URL of the second online album and first album data.

18. The network of claim 17 wherein the first album data includes any combination of a name or ID of the first peer, a name of the first online album, and a thumbnail image representing the first online album.

19. The network of claim 18 wherein in addition to creating the link on the second online album to the first album, the second peer transmits a confirm link request to the first peer computer that includes a name of the second peer and second online album data.

20. The network of claim 19 wherein the second album data includes any combination of a name of the second online album, a URL of the second online album, and a thumbnail image representing the second online album.

21. The network of claim 19 wherein the first peer creates the link on the first online album to the second online album using the second album data received from the second peer.

22. The network of claim 12 wherein in response to the second peer receiving a request to create a link from a first peer, the second peer determines if the second online album allows automatic link creation, and notifies the user of the first node if the second node does not allow automatic link creation.

23. A non-transitory computer readable medium containing program instructions for creating a bidirectional link between first and second online albums in a peer-to-peer photo sharing network, the program instructions for;
   receiving on a first peer, a user request to create a bidirectional link, wherein the request includes an identification of a first online album on the first peer and a URL of a second online album on a second peer;

automatically sending to the second peer, a URL of the first online album and a request to create a link on the second online album to the first online album using the first online album URL; and automatically creating a link on the first online album to the second online album using the URL of the second online album.

24. The computer readable medium of claim 23 further including: displaying with the link to the second online album, information regarding the second online album, including an online status of the peer hosting the linked online album.

25. The computer readable medium of claim 23 further including:

in response to a visitor viewing the second online album, displaying the link to the first online album; and in response to the visitor clicking on the link to the first online album, redirecting the visitor to the first online album, wherein the first online album is displayed with the link to the second album, thereby allowing the visitor to return to the second online album.

26. The computer readable medium of claim 25 further including: displaying on a second online album an option to view related online albums, and displaying the link to the first online album in response to the visitor clicking on the option to view related online albums.

27. The computer readable medium of claim 26 further including: in response to the visitor clicking on the option to view related online albums, displaying an album link page that lists links to related online albums.

28. The computer readable medium of claim 27 further including: displaying for each of the links listed in the album link page, information regarding the linked online album, including an online status of the peer hosting the linked online album.

29. The computer readable medium of claim 23 further including: providing in the request sent from the first peer to the second peer the URL of the second online album and first album data.

30. The computer readable medium of claim 29 further including: providing as the first album data any combination of a name or ID of the first peer, a name of the first online album, and a thumbnail image representing the first online album.

31. The computer readable medium of claim 30 further including: in addition to creating the link on the second online album to the first album by the second peer, transmitting a confirm link request to the first peer computer that includes a name of the second peer and second online album data.

32. The computer readable medium of claim 31 further including: providing as the second album data any combination of a name of the second online album, a URL of the second online album, and a thumbnail image representing the second online album.

33. The computer readable medium of claim 32 wherein the first peer creates the link on the first online album to the second online album using the second album data received from the second peer.

34. The computer readable medium of claim 23 further including: in response to the second peer receiving a request to create a link from a first peer, determining if the second online album allows automatic link creation, and notifying the user of the first node if the second node does not allow automatic link creation.

* * * * *